US012743496B2

(12) United States Patent
Sanghvi et al.

(10) Patent No.: US 12,743,496 B2
(45) Date of Patent: Sep. 22, 2026

(54) SYSTEM AND METHOD TO RECONCILIATE AND SYNCHRONIZE MULTI-LEVEL DATA TOKENS

(71) Applicant: Bank of America Corporation, Charlotte, NC (US)

(72) Inventors: Siten Sanghvi, Westfield, NJ (US); Naga Vamsi Krishna Akkapeddi, Charlotte, NC (US); Igor Derensteyn, Woodland Hills, CA (US); Vincent A Holt, Savannah, TX (US); Pushpanjali Kottapalli, Bridgewater, NJ (US); Robert Kriger, Waxhaw, NC (US); Enrico Ual, Round Rock, TX (US); Bharat Chabra, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 168 days.

(21) Appl. No.: 18/900,155

(22) Filed: Sep. 27, 2024

(65) Prior Publication Data

US 2026/0093790 A1 Apr. 2, 2026

(51) Int. Cl.
*G06F 21/31* (2013.01)

(52) U.S. Cl.
CPC .................................... *G06F 21/31* (2013.01)

(58) Field of Classification Search
CPC ....................................................... G06F 21/31
See application file for complete search history.

(56) References Cited

U.S. PATENT DOCUMENTS

| | | | |
|---|---|---|---|
| 7,369,984 B2 * | 5/2008 | Fairweather | G06F 8/427 704/8 |
| 9,419,951 B1 | 8/2016 | Felsher et al. | |
| 9,876,803 B2 * | 1/2018 | Miu | H04L 63/126 |
| 10,491,675 B2 | 11/2019 | Elko et al. | |
| 11,271,751 B2 | 3/2022 | de Matos | |
| 11,818,267 B1 * | 11/2023 | Bales | H04L 9/3213 |
| 11,941,279 B2 | 3/2024 | Kant et al. | |
| 11,960,412 B2 | 4/2024 | Flynn et al. | |
| 11,971,862 B1 | 4/2024 | Han et al. | |
| 12,045,252 B2 | 7/2024 | Sonner et al. | |
| 2011/0161232 A1 | 6/2011 | Brown | |
| 2013/0054469 A1 * | 2/2013 | Agashe | G06Q 20/20 705/67 |
| 2017/0046688 A1 | 2/2017 | Pande | |
| 2019/0073666 A1 | 3/2019 | Ortiz et al. | |

(Continued)

*Primary Examiner* — Mohammed Waliullah

(57) ABSTRACT

A system comprises a memory communicatively coupled to at least one processor. The at least one processor is configured to receive an authentication request from a first service to authorize a transition of multiple data exchange operations from the first service to a second service, accept a first equity token from the first service, and accept a second equity token from the second service. Further, the at least one processor may be configured to determine whether the first details in the first equity token match the second details in the second equity token, determine that the first details in the first equity token changed into the second details in the second equity token in response to determining that the first details do not match the second details, generating a reconciliation report referencing that the first details changed into the second details, and transmit the reconciliation report to the first service.

20 Claims, 3 Drawing Sheets

(56) References Cited

U.S. PATENT DOCUMENTS

| | | | | |
|---|---|---|---|---|
| 2020/0265417 | A1 | 8/2020 | Bruno | |
| 2020/0394183 | A1 | 12/2020 | Jois | |
| 2021/0366586 | A1 * | 11/2021 | Ryan | G06Q 20/3224 |
| 2023/0134651 | A1 | 5/2023 | Agbamu | |
| 2023/0316261 | A1 * | 10/2023 | Agbamu | G06N 3/09 705/67 |
| 2024/0135337 | A1 * | 4/2024 | Lai | G06Q 20/023 |
| 2025/0131446 | A1 * | 4/2025 | Bijou | G06Q 20/3223 |

* cited by examiner

SYSTEM AND METHOD TO RECONCILIATE AND SYNCHRONIZE MULTI-LEVEL DATA TOKENS

TECHNICAL FIELD

The present disclosure relates generally to providing security operations, and more specifically to a system and method to reconciliate and synchronize multi-level data tokens.

BACKGROUND

In communication systems, data exchange operations between one or more user devices may comprise one or more communication items (e.g., data comprised in header and line items) processed by one or more applications hosted by the user devices. In detailed data exchange operations, these communication items may be lost and/or corrupted during transmissions between multiple applications. For example, each communication item may include multiple data elements that may be processed differently by different layers in a specific application. As different applications pass around the communication items, certain data elements may be missed and/or dropped. In the event of dropped data elements, additional applications may fail to properly perform operations incorporating the communication items.

SUMMARY OF THE DISCLOSURE

In one or more embodiments, systems and methods are configured to evaluate integrity of data exchanged between one or more services in a system. In particular, a system may be configured to train a machine learning (ML) model to verify complete transition of information elements and data between the services. In some embodiments, the system may be configured to create starting data within a transmission processing system and maintain integrity of the starting data as data exchange operations are transmission from one service to another. The system may be configured to synchronize the starting data across multiple services and/or at each instance of new service interaction. If this starting data is not synchronized with the starting data system, the system is configured to inhibit, prevent, and/or reduce complications, as multiple other applications rely on data from the starting data system. Further, the system prevents, inhibits, and/or reduces additional challenges at a communication path level, where some services may not participate in data reconciliation after operations are transitioned. The system may be configured to implement one or more multi-level tokens configured to provide multiple levels of reconciliation and synchronization of modified starting data across multiple services.

In one or more embodiments, the system is configured to perform real-time data reconciliation and synchronization for data exchange operations and starting data across services and network devices (e.g., network components and/or user devices) using multi-level tokens. Each application in the communication path is authenticated and authorized using ID tokens and access tokens. The ID tokens may be configured to ensure authenticity of data after operations performed by subsequent services in the path, while the access tokens may be configured to confirm eligibility of services to receive and process transitions of data exchange operations. The services may be configured to specify reconciliation of transmissions as part of one or more communication payloads. In some embodiments, transmission reconciliations may include references to one or more reconciliation types (e.g., end-to-end, start-to-end, and/or incremental), a location of data to be synchronized, a level of detail (e.g., record-level details and/or data element-level details to be reconciliated), a trace ID, and a communication channel and method for sending tokens for reconciliation. Upon receiving the payloads, each service in a communication path involving multiple services may be configured to confirm (e.g., check and/or verify) whether reconciliation is required. If indicated, a given service may be configured to use one or more equity tokens (e.g., an Application-Specific Equity Token (AET) and/or a Communication-Specific Equity Token (CET)), which are generated in real-time. These equity tokens may be configured to represent each service-specific role and responsibility in processing one or more data exchange operations, including data reconciliation and synchronization. After processing a given data exchange operation, each service may be configured to send a corresponding AET and/or a corresponding CET to a requesting service as specified in the payload. These tokens may be shared with a token analyzer to perform real-time reconciliation by extracting any relevant data from the tokens. The tokens may also be shared with a dashboard application to enable real-time monitoring over time. Herein, the system is configured to verify that each service involved in a communication path comprises a defined role and responsibility, with real-time tracking and reconciliation of data across the data exchange operations in the communication path.

In one or more embodiments, the system described herein are integrated into a practical application of providing integrity layers before data exchange operations are transitioned between two or more services. In particular, by using multi-level tokens, the system may be configured to ensure that each data exchange operation in the services of a communication path is validated at multiple points in real-time. Herein, any immediate validation aids in identifying and resolving discrepancies as data exchange operations occur in the communication path, rather than at an end of a processing cycle and/or the communication path. In some embodiments, the system may be configured to perform one or more incremental reconciliation operations instead of waiting for an entire communication path to be completed.

In one or more embodiments, the system is directed to improvements in computer systems. Specifically, the system reduces processor and memory usage in servers and/or network devices hosting one or more services by proactively maintaining integrity of data and/or data exchange operations in a communication path. In particular, the system may be configured to reduce memory usage by preventing resources from being wasted retrieving data and/or restoring sensitive information in the services involved in the communication path. Further, the system may be configured to inhibit, prevent, reduce, and/or eliminate adverse impacts that may be caused by data and/or data exchange operation mismatches in operations performed along the communication path. In some embodiments, the system is configured to implement real-time reconciliation and detailed tracking to reduce a likelihood of errors in the communication path, which in turn minimizes a need for costly rework and manual intervention.

In one or more embodiments, the system may comprise an apparatus, such as the server. Further, the system may be a data exchange system, that comprises the apparatus. In addition, the system may be configured to perform operations as part of a process performed by the apparatus. As a non-limiting example, the system may comprise a memory and at least one processor communicatively coupled to one another. The memory may be operable to store one or more tokens comprising information representative of one or more data exchange operations associated with one or more services. The at least one processor may be configured to receive an authentication request from a first service to authorize a transition of multiple data exchange operations from the first service to a second service. The authentication request may comprise an identification (ID) token configured to reference that the first service is entitled to transition the data exchange operations to the second service and an access token configured to reference whether the first service is eligible to transition the data exchange operations to the second service. Further, the at least one processor may be configured to determine whether the ID token matches a reference ID token of the one or more tokens, determine whether the access token matches a reference access token of the one or more tokens, determine that the authentication request is acceptable in response to determining that the ID token matches the reference access token and the access token matches the reference access token, transition the data exchange operations from the first service to the second service in response to determining that the authentication request is acceptable, determine whether the data exchange operations comprise a transmission reconciliation to specify that the data exchange operations was communicated to the first service prior to receiving the authentication request accept a first equity token from the first service in response to determining that the data exchange operations comprise the transmission reconciliation, and accept a second equity token from the second service. The first equity token may comprise first details for the data exchange operations. The second equity token may comprise second details for the data exchange operations. The at least one processor may be configured to determine whether the first details in the first equity token matches the second details in the second equity token, determine that the first details in the first equity token changed into the second details in the second equity in response to determining that the first details in the first equity token do not match the second details in the second equity token, generate a reconciliation report referencing that the first details in the first equity token changed into the second details in the second equity token, and transmit the reconciliation report to the first service.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
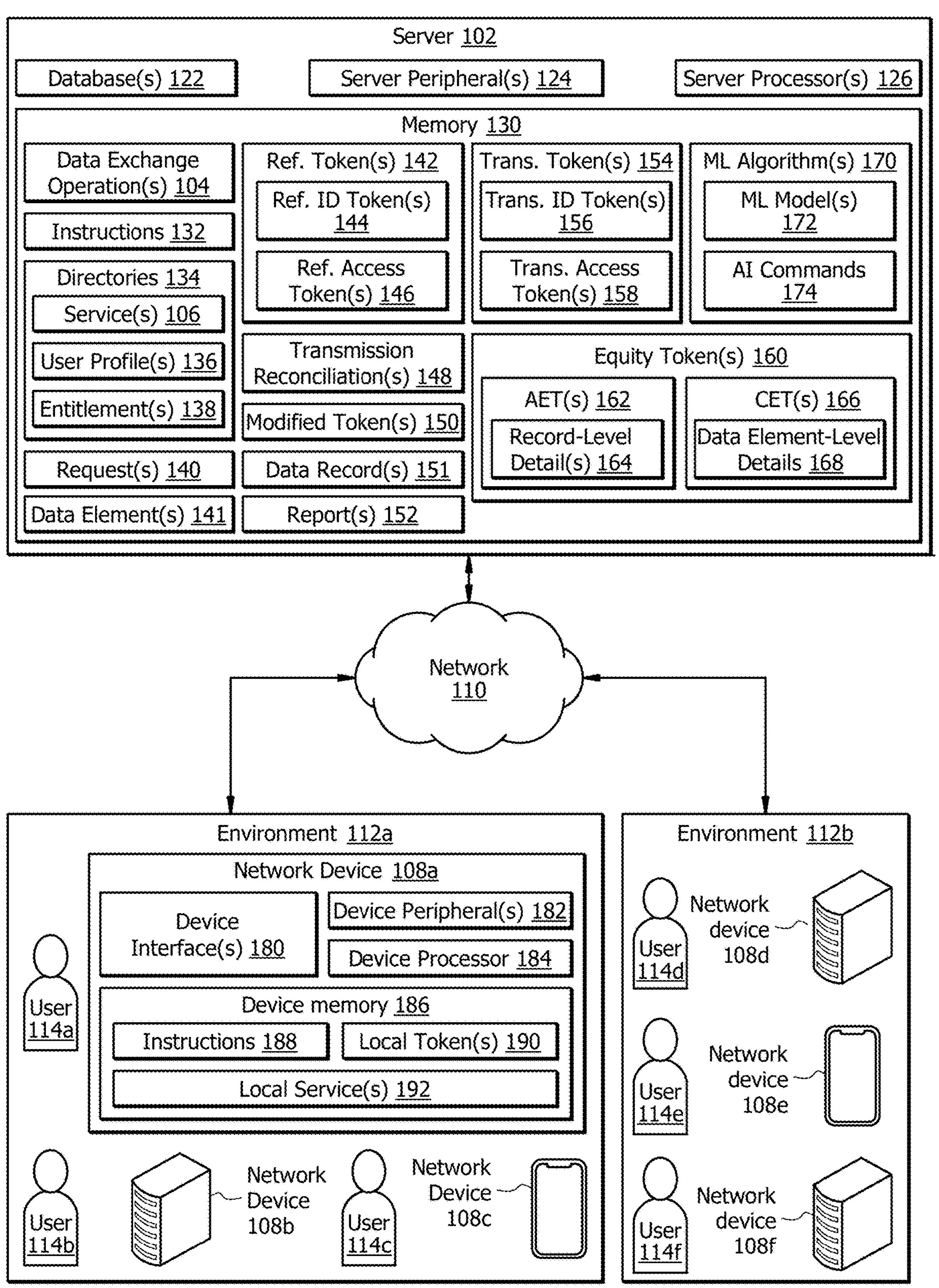
FIG. 1 illustrates a system in accordance with one or more embodiments.
Figure 2:
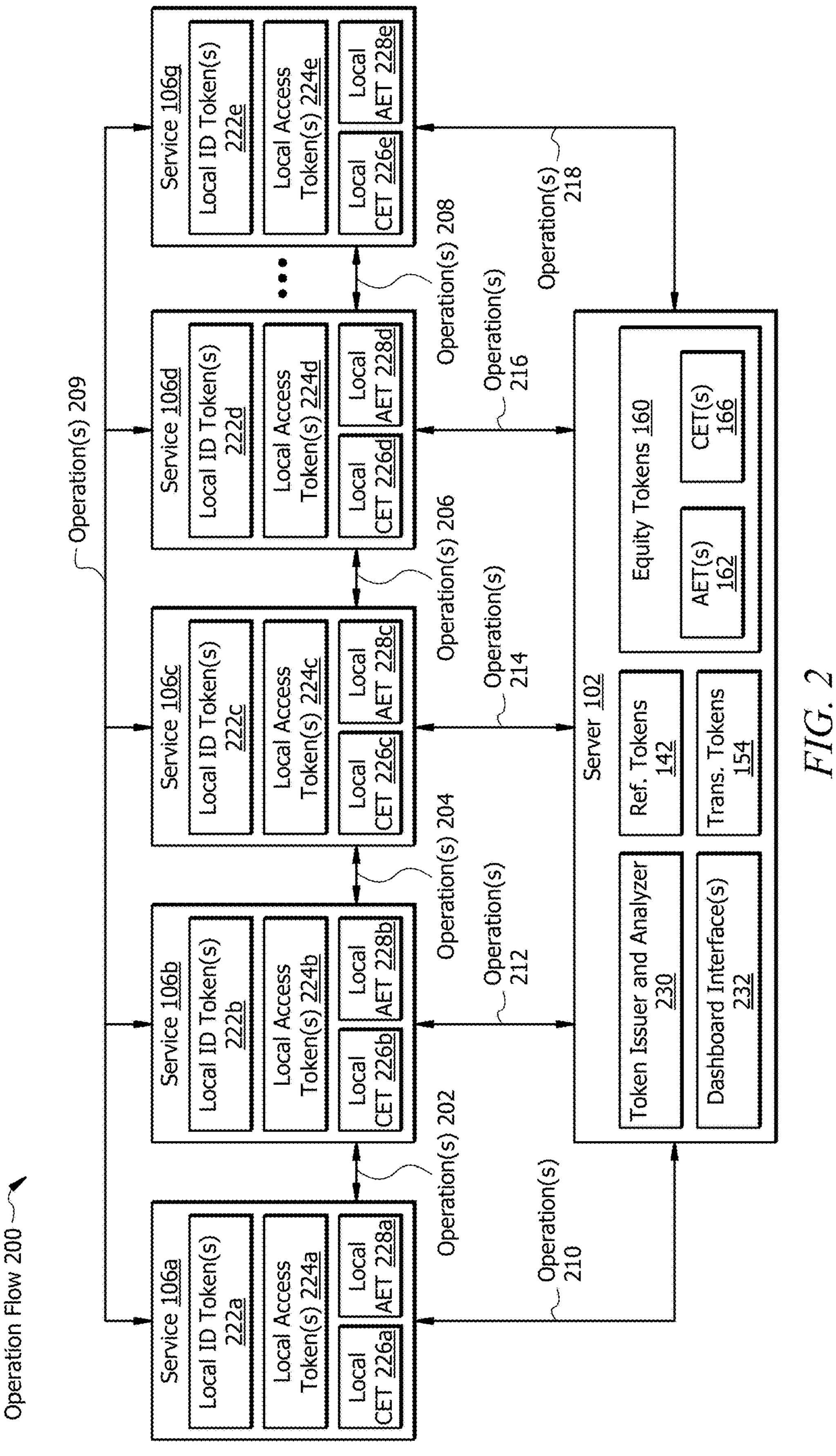
FIG. 2 illustrates an operational flow configured to evaluate communication operations in accordance with one or more embodiments.
Figure 3:
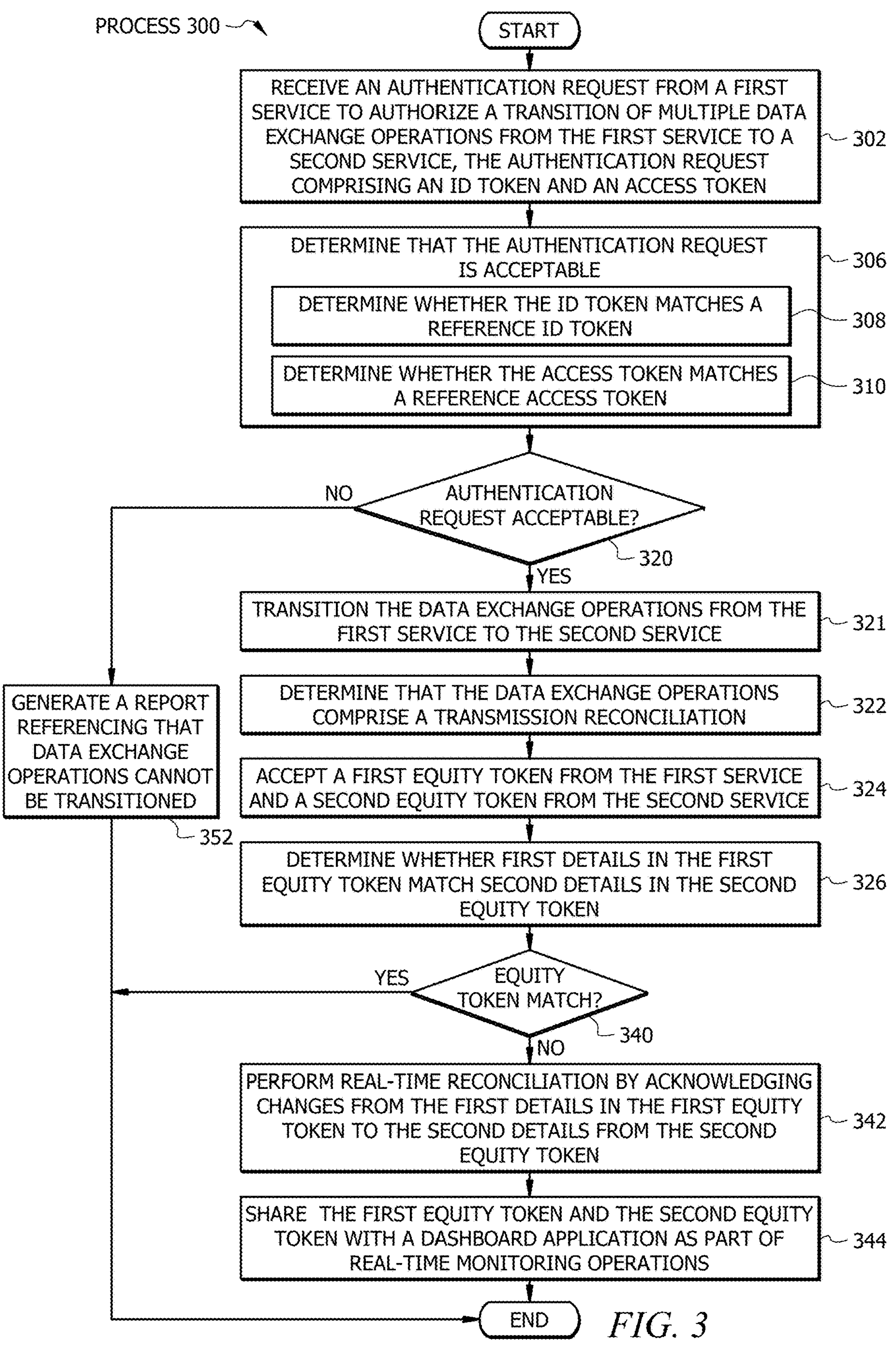
FIG. 3 illustrates an example flowchart of a method to perform the operational flow of FIG. 2 in accordance with one or more embodiments.

As described above, this disclosure provides various systems and methods to reconciliate and synchronize multi-level data tokens. FIG. 1 illustrates a system 100 in which a server 102 configured to perform one or more data exchange operations 104. FIG. 2 illustrates an operational flow 200 performed by the system 100 of FIG. 1. FIG. 3 illustrates a process 300 performed by the system 100 of FIG. 1.

System Overview

FIG. 1 illustrates an example system 100, in accordance with one or more embodiments. The system 100 may comprise a server 102 configured to transition one or more data exchange operations 104 between two or more services 106. The system 100 includes a server 102 communicatively coupled to a network device **108*a*, a network device 108*b*, a network device 108*c*, a network device 108*d*, a network device 108*e*, and a network device 108*f* (collectively, network devices 108) via a network 110. The network devices 108 may be user nodes configured to trigger exchanges of data and/or perform one or more communication operations with each other and/or with the server 102 via the network 110. The network devices 108 may be working nodes configured to receive instructions to perform one or more communication operations based on instructions received from the server 102. In some embodiments, some of the network devices 108 may be clustered together in one or more environments 112 (e.g., shown as an environment 112*a* and an environment 112*b*). Each of the network devices 108 may be associated with one or more corresponding operators. These operators are shown as a user 114*a*, a user 114*b*, a user 114*c*, a user 114*d*, a user 114*e*, and a user 114*f* (collectively, users 114) in the environments 112. In FIG. 1, the environment 112*a* is shown comprising the user 114*a* associated with the network device 108*a*, the user 114*b* associated with the network device 108*b*, and the user 114*c* associated with the network device 108*c*. The environment 112*b* is shown comprising the user 114*d* associated with the network device 108*d*, the user 114*e* associated with the network device 108*e*, and the user 114*f* associated with the network device 108*f***.

In one or more embodiments, the server 102 may comprise one or more databases 122, one or more server peripherals 124, one or more server processors 126, and at least one memory 130 communicatively coupled to one another. In some embodiments, the memory 130 may comprise instructions 132, one or more directories 134 comprising information associated with the one or more services 106, user profiles 136 corresponding to one or more of the network devices 108, and one or more entitlements 138, the one or more data exchange operations 104, one or more requests 140, one or more data elements 141, one or more reference tokens 142 comprising one or more reference identification (ID) tokens 144 and one or more reference access tokens 146, one or more transmission reconciliations 148, one or more modified tokens 150, one or more data records 151, one or more reports 152, one or more transition tokens 154 comprising one or more transition ID tokens 156 and one or more transition access tokens 158, one or more equity tokens 160 comprising one or more Application-Specific Equity Tokens (AETs) 162 associated with one or more record-level details 164 and one or more Communication-Specific Equity Tokens (CETs) 166 associated with one or more data element-level details 168, one or more machine learning (ML) algorithms 170 configured to train one or more models 172, and one or more artificial intelligence (AI) commands 174.

Referring to the network device **108*a* a non-limiting example, the network device 108*a* may comprise one or more device interfaces 180, one or more device peripherals 182, at least one device processor 184, and at least one device memory 186 communicatively coupled to one another. The device memory 186 may comprise device instructions 188, at least one local token 190, and/or one or more local services 192**.

System Components

Server

The server 102 is generally any device or apparatus that is configured to process data and communicate with computing devices (e.g., the network devices 108), additional databases, systems, and the like, via the one or more server peripherals 124 (i.e., a user interface or a network interface). The server 102 may comprise the server processor 126 that is generally configured to oversee operations of the processing engine. The operations of the processing engine are described further below in conjunction with the system 100 described in FIG. 1, the operational flow 200 described in FIG. 2, and the process 300 described in FIG. 3.

The server 102 comprises multiple databases 122 configured to provide one or more memory resources to the server 102 and the network devices 108. The server 102 comprises the server processor 126 communicatively coupled with the databases 122, the server peripherals 124, and the memory 130. The server 102 may be configured as shown, or in any other configuration. In one or more embodiments, the databases 122 are configured to store data that enables the server 102 to configure, manage and coordinate one or more middleware systems. In some embodiments, the databases 122 store data used by the server 102 to function as a halfway point in between services 106 and other tools or databases.

In one or more embodiments, the server peripherals 124 may be configured to enable wired and/or wireless communications. The server peripherals 124 may be configured to communicate data between the server 102 and network devices 108 (i.e., user devices, routers, and/or managed servers in the network 110), systems, or domain(s) via the network 110. For example, the server peripherals 124 may comprise a WI-FI interface, a LAN interface, a WAN interface, a modem, a switch, or a router. The server processor 126 may be configured to send and receive data using the server peripherals 124. The server peripherals 124 may be configured to use any suitable type of communication protocol. In some embodiments, the server peripherals 124 may be an admin console comprising a display configured to show a user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in a server cluster. The server cluster may be a group of managed servers that work together to provide scalability and higher availability for the services 106. In this regard, the services 106 are developed and deployed as part of at least one domain. The services 106 may be applications accessed via one or more dedicated application programming interfaces (APIs). In other embodiments, one instance of the managed servers in the middleware server domain may be configured as the server 102. The server 102 provides a central point for managing and configure the managed servers, any of the one or more services 106, and the one or more local applications 194.

The at least one server processor 126 may comprise one or more processors communicatively coupled to the memory 130. The server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 126 may be a programmable logic device, a microcontroller, a microprocessor, or any suitable combination of the preceding. The one or more server processors 126 may be configured to process data and may be implemented in hardware or software executed by hardware. For example, the server processor 126 may be 8-bit, 16-bit, 32-bit, 64-bit or of any other suitable architecture. The server processor 126 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more server processors 126 are configured to execute various instructions. For example, the one or more server processors 126 are configured to execute the instructions 132 to implement the functions disclosed herein, such as some or all of those described with respect to FIGS. 1 and 2. In some embodiments, the functions described herein are implemented using logic units, FPGAs, ASICs, DSPs, or any other suitable hardware or electronic circuitry.

In one or more embodiments, the server peripherals 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server peripherals 124 may be configured to support any suitable type of communication protocol as would be appreciated by one of ordinary skill in the art.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the one or more directories 134 comprising information associated with the one or more services 106, the user profiles 136 corresponding to one or more of the network devices 108, and the one or more entitlements 138, the one or more data exchange operations 104, the one or more requests 140, the one or more data elements 141, the one or more reference tokens 142 comprising the one or more reference identification (ID) tokens 144 and the one or more reference access tokens 146, the one or more transmission reconciliations 148, the one or more modified tokens 150, the one or more data records 151, the one or more reports 152, the one or more transition tokens 154 comprising the one or more transition ID tokens 156 and the one or more transition access tokens 158, the one or more equity tokens 160 comprising one or more AETs 162 associated with one or more record-level details 164 and the one or more CETs 166 associated with one or more data element-level details 168, the one or more ML algorithms 170 configured to train the one or more models 172, the one or more AI commands 174, and/or any other data or instructions. The instructions 132 may comprise any suitable set of instructions, logic, rules, or code operable to execute the server processor 126.

The directories 134 may be ledgers, databases, tables, and/or reference files comprising the one or more user profiles 136, the one or more entitlements 138, and one or more services 106. In one or more embodiments, the user profiles 136 may comprise multiple profiles associated with one or more entitlements 138 to access and/or modify the services 106. Each of the user profiles 136 may be associated with one or more entitlements 138. The entitlements 138 may indicate that a given network device 108 is allowed to access one or more network resources in accordance with one or more rules and policies. The entitlements 138 may indicate that a given network device 108 is allowed to perform one or more operations in the system 100 (e.g., provide a specific application data access to one of the users 114). To secure or protect operations of the network devices 108 from bad actors, the entitlements 138 may be assigned to a given user profile 136 in accordance with updated security information, which may provide guidance parameters to the use of the entitlements 138 based at least upon corresponding rules and policies. In one or more embodiments, the one or more services 106 are access to one or more application operations performed in accordance with application data. In some embodiments, the user profiles 136 may comprise multiple profiles for users (e.g., user 114). Each user profile 136 may associated with one or more entitlements 138. As described above, the entitlements 138 may indicate that a given user 114 is allowed to access one or more network resources in accordance with one or more rules and policies to perform one or more operations in the services 106. The entitlements 138 may indicate that a given user is allowed to perform one or more data exchange operations 104 in the system 100. In one or more embodiments, each of the user profiles 136 may comprise information about at least one user 114 entitled to trigger one or more the data exchange operations 104 and/or communication operations.

In some embodiments, the rules and policies may be security configuration commands or regulatory operations predefined by an organization or one or more users 114. In one or more embodiments, the rules and policies may be dynamically defined by the one or more users 114. The rules and policies may be prioritization rules configured to instruct one or more network devices 108 to establish one or more application configuration parameters or perform one or more application operations in the system 100 in a specific order. The one or more rules and policies may be predetermined or dynamically assigned by a corresponding user 114 or an organization associated with the user 114.

In some embodiments, the data exchange operations 104 may be executed by the server processor 126 configured to enable data objects comprising one or more data elements 141 to be exchanged between the server 102, the network devices 108, and/or one or more additional devices communicatively coupled to the server 102 based on the one or more rules and policies. In one or more embodiments, the data exchange operations 104 may be configured to indicate one or more data objects (e.g., via data object information) to be exchanged between the server 102 and at least one of the network devices 108. The data exchange operations 104 may be configured to generate and analyze one or more requests 140 and/or one or more reports 152. The reports 152 may comprise data indicating warnings and alerts among other information. In some embodiments, the reports 152 may be audio and/or visual signaling presented in the one or more server peripherals 124 and/or the one or more device peripherals 182. The one or more requests 140 may be one or more communications configured to provide triggers in the form of communication or control signals to start operations such as fetching the instructions 132 or running one or more of data exchange operations 104. The requests 140 may provide user information to the server 102 to indicate at least one user profile 136 associated with one or more of the entitlements 138 to access and/or modify any of the services 106 available in the server 102. The requests 140 may be configured to provide lists, security information, and configuration commands that the server 102 uses to set up a specific service 106 for one of the network devices 108. The requests 140 may comprise data that provides starting procedure configuration to the server 102. In one or more embodiments, the requests 140 may be optimized (e.g., simplified to a target state of efficiency) instructions that trigger establishing of a specific procedure in the server 102.

In one or more embodiments, the requests 140 may be one or more information strings, alphanumeric data, and/or configuration commands to be exchanged in a data network. The one or more requests 140 may be configured to trigger one or more of the data exchange operations 104 and/or one of the communication operations. The requests 140 may be exchanged in bulk or individually over the network 110. The requests 140 may be one or more communications configured to provide triggers in the form of communication or control signals to start operations such as fetching the instructions 132 or performing the one of the data exchange operations 104. The requests 140 may provide user information to the server 102 to indicate at least one user profile 136 associated with one or more of the entitlements 138 to access and/or modify any of the services 106 available in the server 102.

In one or more embodiments, the one or more data exchange operations 104 may be one or more operations performed by one or more services 106. The data exchange operations 104 may be one or more operations comprising multiple stages and/or transitions at different services 106. For example, one or more data exchange operations 104 may be configured to start at one service **106*a* that transitions to other servers 106*b*-106*d*. For example, the server 102 may be configured to set up one or more data exchange operations 104 and one or more data elements 141 and/or data records 151 to be modified by the data exchange operations 104 performed by one or more services 106**.

The one or more data elements 141 may be individual data in one or more data objects. The data elements 141 may be alphanumeric bitstrings comprising a specific format. The data elements 141 may be data information configured to reference data objects stored in a specific database. The one or more data records 151 may be one or more tables, ledgers, files, and/or data documents comprising information relating to one or more data objects. In some embodiments, each of the data exchange operations 104 may be configured to modify one or more data elements 141 and/or one or more data records 151. The server 102 may be configured to keep track and/or monitor one or more of the data elements 141 and/or the data records 151 as the data exchange operations transition from one service 106 to another service 106.

In one or more embodiments, the one or more reference tokens 142 may comprise the one or more reference ID tokens 144 and/or the one or more reference access tokens 146. The one or more reference tokens 142 may be one or more reference tokens 142 comprising one or more authentication parameters and/or one or more communication parameters configured to verify authenticity of one or more of the data exchange operations 104. The services 106 may be configured to generate one or more tokens. Herein, the server 102 may be configured to determine one or more verification elements and save these verification elements in the form of one or more reference tokens 142. In one or more embodiments, the reference tokens 142 may be configured to provide reference verification information to confirm whether verification information received is authentic and/or whether one or more data exchange operations transitions from another service 106 are acceptable or not acceptable. The reference tokens 142 may comprise one or more reference ID tokens 144 and/or one or more reference access tokens 146. The one or more reference ID tokens 144 may be one or more tokens comprising ID information associated with one or more services 106 expected to perform one or more of the data exchange operations 104. The one or more reference ID tokens 144 may be one or more tokens configured to reference whether a specific service 106 is entitled to transition one or more data exchange operations 104 from one specific service 106 to another specific service 106. The one or more reference access tokens 146 may be one or more tokens comprising access credentials associated with one or more services 106 expected to perform one or more of the data exchange operations 104. The one or more reference access tokens 146 may be one or more tokens configured to reference whether a specific service 106 is entitled to access network resources associated with performing one or more data exchange operations 104 at a specific service 106. In some embodiments, the reference tokens 142 may comprise one or more data elements 141 referencing a service precedence and/or a service destination.

In some embodiments, the transmission reconciliation 148 may be triggers in the form of communication and/or control signals to start operations such as fetching the instructions 132 or running one or more scripts. The transmission reconciliation 148 may be one or more information elements in a communication configured to reference to the server 102 that a reconciliation of data elements 141 and/or data records 151 is requested as the data exchange operations 104 are transitioned between any two services 106. The transmission reconciliation 148 may be set up along one or more application operations and one or more application configuration parameters. The application operations and the application configuration parameters may provide service information data indicating any services 106 (e.g., one or more of applications) available in the server 102 and the network devices 108. The application operations and the application configuration parameters may provide lists, security information, and configuration parameters that the server 102 uses to set up a specific service 106. The application operations and the application configuration parameters may be configuration data that provides starting procedure configuration to the server 102. In one or more embodiments, the application configuration parameters may be optimized instructions that enable establishing of a specific procedure in a middleware server domain. In the example of FIG. 1, the application configuration parameters may comprise performing application installation operations configured to install multiple middleware scripts generated by the server 102.

In one or more embodiments, the one or more transition tokens 154 may comprise the one or more transition ID tokens 156 and/or the one or more transition access tokens 158. The one or more transition tokens 154 may be one or more data containers comprising one or more data elements 141 and/or one or more data records 151. The one or more transition tokens 154 may be similar to the reference tokens 142. The one or more transition tokens 154 may be one or more tokens received from one or more services 106 in real time indicating credentials and/or authentication information. In some embodiments, the services 106 may be configured to provide one or more of the transition tokens 154. The services 106 may be hosted at one or more network devices 108 and/or the server 102. The one or more transition tokens 154 may comprise one or more transition ID tokens 156 and/or one or more transition access tokens 158. The one or more transition ID tokens 156 may be one or more tokens comprising ID information associated with one or more services 106 performing one or more of the data exchange operations 104. The one or more reference ID tokens 144 may be one or more tokens configured to reference whether a specific service 106 is entitled to transition one or more data exchange operations 104 from one specific service 106 to another specific service 106. The one or more transition access tokens 158 may be one or more tokens comprising access credentials associated with one or more services 106 performing one or more of the data exchange operations 104. The one or more reference access tokens 146 may be one or more tokens configured to reference whether a specific service 106 is entitled to access network resources associated with performing one or more data exchange operations 104 at a specific service 106. In some embodiments, the transition tokens 154 may comprise one or more data elements 141 referencing a service precedence and/or a service destination.

In one or more embodiments, the server 102 may be configured to compare one or more of the transition tokens 154 received with one or more of the reference tokens 142. The server 102 may be configured to determine whether one or more of the transition tokens 154 received at least partially match one of the reference tokens 142. Herein, the server 102 may be configured to determine whether transition operations where one or more of the data exchange operations 104 are transitions are acceptable (e.g., legitimate) or not acceptable (e.g., unacceptable and/or illegitimate).

In one or more embodiments, the one or more equity tokens 160 may comprise the one or more AETs 162 and/or the one or more CETs 166. The one or more equity tokens 160 may be one or more communication elements referencing expected modifications and/or data exchange operations 104 of one or more data elements 141 and/or one or more data records 151. The one or more AETs 162 may be one or more tokens representative of one or more service-specific information elements and/or information referencing one or more expected service access and/or service operations in the data exchange operations 104. Each of the AETs 162 may comprise one or more record-level details 164. The record-level details 164 may comprise information referencing changes made to records during one or more of the data exchange operations 104. The AETs 162 may comprise information referencing a number of records received at and/or by a specific service 106, a number of records sent and/or posted at and/or by a specific service 106, a number of records errored at and/or by one or more of the data exchange operations 104 performed by a specific service 106, a service information element comprising one or more numeric or alphanumeric keys (e.g., alternate identifier) identifying a specific service system that receives a batch and/or real-time service request, a source information element comprising a numeric or alphanumeric key (alternate identifier) identifying a specific service system that sends a batch and/or a real-time service request, a target information element comprising a destination for a given AET 162, a recon trace ID comprising a unique identifier assigned by an originating service 106 configured to track and/or trace reconciliation, an AET level trace ID comprising a unique identifier assigned by a service system configured to track and/or trace activity through an environment, and/or an AET data payload comprising a list of key-value pairs that may be configured to match reconciliation of one or more data records 151. The one or more CETs 166 may be one or more tokens representative of one or more operation-specific information elements and/or information referencing one or more expected operations and/or operations performed in the data exchange operations 104. Each of the CETs 166 may comprise one or more data element-level details 168. The data element-level details 168 may comprise information referencing changes made to data elements during one or more of the data exchange operations 104. The CETs 166 may comprise information referencing a number of records received at and/or by a specific service 106, a number of data elements received for each record, one or more information elements referencing whether one or more transformations where applied to the data elements 141 and/or data records 151, a service information element comprising one or more numeric or alphanumeric keys (e.g., alternate identifier) identifying a specific service system that receives a batch and/or real-time service request, a source information element comprising a numeric or alphanumeric key (alternate identifier) identifying a specific service system that sends a batch and/or a real-time service request, a target information element comprising a destination for a given CET 166, a recon trace ID comprising a unique identifier assigned by an originating service 106 configured to track and/or trace reconciliation, a CET level trace ID comprising a unique identifier assigned by a service system configured to track and/or trace activity through an environment, and/or a CET data payload comprising a list of key-value pairs that may be configured to match to reference transformations applied to one or more data elements 141.

In one or more embodiments, the AETs 162 and/or the CETs 166 may be shared between one or more of the services 106 and/or the server 102. The AETs 162 and/or the CETs 166 may be shared to perform one or more reconciliation operations where the server 102 and/or the services 106 are configured to confirm whether one or more data exchange operations 104 are transitioned in an acceptable manner from one service to another service. The AETs 162 and/or the CETs 166 may be shared between the services 106 and/or the server 102 for real-time monitoring operations. The server 102 may be configured to provide a central reconciliation of the data elements 141 and/or the records 151 modified from one service 106 to another service 106 based on data extraction from the AETs 162 and/or the CETs 166.

In some embodiments, the server 102 may be configured to generate one or more of the AETs 162 and/or one or more of the CETs 166. The AETs 162 and/or the CETs 166 may be service-specific and/or operation-specific. In this regard, the equity tokens 160 may be service-specific and/or operation-specific. The AETs 162 and/or the CETs 166 may be modified dynamically upon identifying changes to the data elements 141 and/or the data records 151 at the service-level. The AETs 162 and/or the CETs 166 may be modified periodically over time. In some embodiments, the modified tokens 150 may be one or more tokens modified by one or more of the services 106. The modified tokens 150 may be modified after receiving one or more communication operations from the services 106. The modified tokens 150 may be one or more of the aforementioned tokens in a transition state before one or more of the reference tokens 142 and/or the equity tokens 160 are updated.

In one or more embodiments, the ML algorithms 170 may be executed by the server processor 126 to evaluate the communication operations, the data exchange operations 104, and/or the multiple tokens. Further, the ML algorithms 170 may be configured to interpret and transform the requests 140 and/or the instructions 132 into structured data sets and subsequently stored as files or tables. The ML algorithms 170 may cleanse, normalize raw data, and derive intermediate data to generate uniform data in terms of encoding, format, and data types. The ML algorithms 170 may be executed to run user queries and advanced analytical tools on the structured data and/or the unstructured data in accordance with one or more ML models 172. The ML algorithms 170 may be configured to generate the one or more AI commands 174 based on one or more results of the data exchange operations 104. The AI commands 174 may be parameters that proactively trigger one or more of the data exchange operations 104. The AI commands 174 may be combined with the existing instructions 132 to dynamically trigger and/or perform one or more data authentication operations and/or some or all of the data exchange operations 104. The AI commands 174 may be configured to trigger one or more cognitive AI operations in accordance with one or more ML models 172. The ML models 172 may be trained by the one or more ML algorithms 170 based on historic information associated with any data exchange operations 104 performed by the services 106 and/or the server 102.

In one or more embodiments, the server 102 and/or the services 106 are configured to perform one or more reconciliation operations where the data elements 141 and/or the data records 151 are evaluated as data exchange operations are transitioned from one service 106 to another. The server 102 and/or the services 106 may be configured to perform real-time data reconciliation and synchronization for data exchange operations 104 and starting data across applications (e.g., services) and devices using multi-level tokens. Each application in a communication path may be authenticated and authorized using ID and access tokens, respectively. The ID tokens may be configured to verify an authenticity of a next application in the path. The access token may be configured to confirm eligibility to receive and process the data exchange operations 104. In some embodiments, one or more applications in the communication path may specify a need for reconciliation as part of a communication payload. Herein, the server 102 and/or the services 106 may be configured to reference a transmission reconciliation 148, a reconciliation type (e.g., end-to-end, start-to-end, or incremental among others), a location, a level of detail (e.g., record-level details 164 and/or data element-level details 168), a trace ID, a communication channel, and/or a method for sending tokens for reconciliation. Upon receiving the payload, the next application in the communication path checks whether one or more reconciliation operations are required. If indicated, the application uses the AETs 162 and the CETs 166 to reconciliate one or more of the data elements 141 and/or the data records 151 generated in real-time. The equity tokens 160 may be configured to represent specific role for each application and responsibility in processing the data exchange operations 104, including data reconciliation and synchronization. After processing the data exchange operations 104, the application may send the AETs 162 and the CETs 166 to the requesting applications as specified in the payload. Then, the tokens may be shared with the server 102 to perform real-time reconciliation by extracting the relevant data from the tokens. Further, the tokens may be shared with a dashboard application to enable real-time monitoring and/or tracking of the data elements 141 and/or the data records 151 throughout the data exchange operations 104. In one or more embodiments, the server 102 and/or the services 106 may be configured to confirm, validate, and/or ensure that each application involved in the communication path comprises a defined role and responsibility, with real-time tracking and reconciliation of data across the entire data exchange operations 104 process. In some embodiments, the communication path is the route that the data exchange operations 104 are expected to follow though one or more services 106.

In one or more embodiments, the one or more reference ID tokens 144 and/or the one or more transition ID tokens 156 may be used for authentication of services 106 along a communication path. The one or more reference ID tokens 144 and/or the one or more transition ID tokens 156 may be configured to authenticate the next application in the communication path before sending the data elements 141, the data records 151, and/or one or more data exchange operations 104. In some embodiments, transition of the data exchange operations 104 may comprise transition of one or more of the data elements 141 and/or the data records 151 from one service 106 to another service 106.

The one or more reference access tokens 146 and/or the transition access tokens 158 may be used for authorization of services 106 along the communication path. The one or more reference access tokens 146 and/or the transition access tokens 158 may be configured to authorize whether the next application in the communication path is eligible to receive the data elements 141, the data records 151, and/or one or more data exchange operations 104.

In one or more embodiments, the equity tokens 160 reference that each service 106 comprises a specific role and/or a specific equity in processing the data exchange operations 104, as well as responsibility for data reconciliation and synchronization. The one or more AETs 162 may be generated at runtime. The one or more AETs 162 may be configured to allow each service 106 to obtain record-level details 164 for one or more of the data exchange operations 104, comprising information on received, sent, and/or posted (e.g., performed) data exchange records and/or errors. The one or more CETs 166 may be generated at runtime. The one or more CETs 166 may be configured to allow each service 106 to obtain data element-level details 168 on data exchange operations 104, comprising information on transformations applied to one or more data elements 141.

In FIG. 1, while one or more record-level details 164 are shown along the AETs 162 and one or more data element-level details 168 are shown along the CETs, the AETs 162 and/or the CETs 166 may comprise one or more record-level details 164 and/or one or more data element-level details 168.

In one or more embodiments, the types of reconciliation and data synchronization performed using the equity tokens 160 may comprise end-to-end, start-to-end, and/or incremental reconciliation operations. The end-to-end reconciliation operations may comprise analyzing and comparing data records 151 from a point of origin to a final system involved in the data exchange operations 104 in a communication path. The start-to-end reconciliation operations may comprise considering only the data records 151 originating from systems at the start and at the end of a data exchange operation 104, a data exchange operation 104, and/or at least a portion of the communication path. Further, the start-to-end reconciliation operations may be configured to focus on ensuring that a data exchange operation 104, a data exchange operation 104, and/or at least a portion of the communication path completes the process to a final stage. The incremental reconciliation operations may be focused on one or more systems and/or services 106 in the communication path. In particular, the incremental reconciliation operations may be configured to verify that any two systems and/or services 106 in the communication path interact as intended.

In one or more embodiments, the server 102 and/or the services 106 may be configured to perform one or more levels of reconciliation and data synchronization that may be assigned to one or more of the equity tokens 160 at a data record-level and/or a data element-level. The data record reconciliation level may comprise validating technical handshakes between two or more systems and/or services 106 and/or capturing unique record identifiers such as an application number (e.g., service number), a trace ID, a process name, and one or more timestamps. The data element reconciliation level may comprise validating consistency and completeness of data elements 141 as the data exchange operations 104 move between two or more systems and/or the services 106 and/or information on transformations and/or enrichment of one or more of the data elements 141.

Network

The network 110 facilitates communication between and amongst the various devices of the system 100. The network 110 may be any suitable network operable to facilitate communication between the server 102 and the network devices 108 of the system 100. The network 110 may include any interconnecting system capable of transmitting audio, video, signals, data, data packets, messages, or any combination of the preceding. The network 110 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Network Devices

In one or more embodiments, each of the network devices 108 (e.g., the network devices 108*a*-108*f*) may be any computing device configured to communicate with other devices, such as the server 102, other network devices 108 in the environment 112*a* and the environment 112*b*, databases, and the like in the system 100. Each of the network devices 108 may be configured to perform specific functions described herein and interact with one or more network devices 108*a*-108*f* in the environments 112. Examples of the network devices 108 comprise, but are not limited to, a laptop, a computer, a smartphone, a tablet, a smart device, an IoT device, a simulated reality device, an augmented reality device, a router, a managed server, or any other suitable type of device.

The network devices 108 may be hardware configured to create, transmit, and/or receive information. The network devices 108 may be configured to receive inputs from a user, process the inputs, and generate data information or command information in response. The data information may include documents or files generated using a user interface. The command information may include input selections/commands triggered by a user using a peripheral component or one or more device peripherals 182 (i.e., a keyboard) or an integrated input system (i.e., a touchscreen presenting a user interface). The network devices 108 may be communicatively coupled to the server 102 via a network connection (i.e., device interface 180 in the server 102). The network devices 108 may transmit and receive data information, command information, or a combination of both to and from the server 102 via the device interface 180. In one or more embodiments, the network devices 108 is configured to exchange data, commands, and signaling with the server 102. In some embodiments, the network devices 108 are configured to trigger the start of one or more communication operations. The network devices 108 may be configured to trigger network devices to perform one or more communication operations. In one or more embodiments, while FIG. 1 shows the network device 108*b*, and the network device 108*c* in the environment 112*a*, a given environment 112*a* may comprise less or more network devices 108.

In one or more embodiments, referring to the network device 108*a* as a non-limiting example of the network devices 108, the network device 108*a* may comprise one or more device interfaces 180, one or more device peripherals 182, a device processor 184, and a device memory 186. The device interfaces 180 may be any suitable hardware or software (e.g., executed by hardware) to facilitate any suitable type of communication in wireless or wired connections. These connections may comprise, but not be limited to, all or a portion of network connections coupled to additional network devices 108*b*-108*f*, the server 102, the Internet, an Intranet, a private network, a public network, a peer-to-peer network, the public switched telephone network, a cellular network, a LAN, a MAN, a WAN, and a satellite network. The device interfaces 180 may be configured to support any suitable type of communication protocol.

In one or more embodiments, the one or more device peripherals 182 may comprise audio devices (e.g., speaker, microphones, and the like), input devices (e.g., keyboard, mouse, and the like), or any suitable electronic component that may provide a modifying or triggering input to the network device 108*a*. For example, the one or more device peripherals 182 may be speakers configured to release audio signals (e.g., voice signals or commands) during media playback operations. In another example, the one or more device peripherals 182 may be microphones configured to capture audio signals from the user 114*a*. In one or more embodiments, the one or more device peripherals 182 may be configured to operate continuously, at predetermined time periods or intervals, or on-demand.

The device processor 184 may comprise one or more processors communicatively coupled to and in signal communication with the device interfaces 180, the device peripherals 182, and the device memory 186. The device processor 184 is any electronic circuitry, including, but not limited to, state machines, one or more CPU chips, logic units, cores (e.g., a multi-core processor), FPGAs, ASICs, or DSPs. The device processor 184 may be a programmable logic device, a microcontroller, a microprocessor, or any suitable combination of the preceding. The one or more processors in the device processor 184 are configured to process data and may be implemented in hardware or software executed by hardware. For example, the device processor 184 may be an 8-bit, a 16-bit, a 32-bit, a 64-bit, or any other suitable architecture. The device processor 184 comprises an ALU to perform arithmetic and logic operations, processor registers that supply operands to the ALU, and store the results of ALU operations, and a control unit that fetches software instructions such as device instructions 188 from the device memory 186 and executes the device instructions 188 by directing the coordinated operations of the ALU, registers, and other components via a device processing engine (not shown). The device processor 184 may be configured to execute various instructions. For example, the device processor 184 may be configured to execute the device instructions 188 to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the device memory 186 may comprise multiple local operation data, one or more local tokens 190, and/or one or more local services 192 associated with the server 102. The local operation data may be data configured to enable one or more data processing operations such as those described in relation with the server 102. The local operation data may be partially or completely different from those comprised in the memory 130. The local tokens 190 may be one or more of the transition tokens 154 before these tokens are transmitted to the server 102 and/or one or more equity tokens 160. The local services 192 may be one or more of the services 106 described in relation with the server 102. In some embodiments, the local services 192 may be partially or completely different from those comprised in the memory 130. As described above, the services 106 performing the one or more transitions and/or the one or more data exchange operations 104 may be hosted at the server 102 and/or one or more of the network devices 108.

Operational Flow to Reconciliate and Synchronize Multi-level Data Tokens

FIG. 2 shows an operational flow 200 in which the system 100 of FIG. 1 is configured to transition one or more data exchanging operations 104 between two or more services 106, in accordance with one or more embodiments. In FIG. 2, the operational flow 200 comprises multiple operations 202-218. The operational flow 200 may be performed between the server 102 and one or more network devices 108 hosting one or more of the services 106*a*-106*g*. The services 106 comprise one or more local ID tokens 222, one or more local access tokens 224, one or more local CETs 226, and one or more local AETs 228. A service 106*a* comprises one or more local ID tokens 222*a*, one or more local access tokens 224*a*, at least one local CET 226*a*, and at least one local AET 228*a*. A service 106*b* comprises one or more local ID tokens 222*b*, one or more local access tokens 224*b*, at least one local CET 226*b*, and at least one local AET 228*b*. A service 106*c* comprises one or more local ID tokens 222*c*, one or more local access tokens 224*c*, at least one local CET 226*c*, and at least one local AET 228*c*. A service 106*d* comprises one or more local ID tokens 222*d*, one or more local access tokens 224*d*, at least one local CET 226*d*, and at least one local AET 228*d*. A service 106*g* comprises one or more local ID tokens 222*g*, one or more local access tokens 224*g*, at least one local CET 226*g*, and at least one local AET 228*g*. The server 102 is shown comprising a token issuer and analyzer 230, multiple dashboard interfaces 232, multiple reference tokens 142, multiple transition tokens 154, and multiple equity tokens 160 comprising one or more AETs 162 and one or more CETs 166.

In one or more embodiments, the operational flow 200 may perform the one or more operations 202-218 in the numbered order and/or a different order. The one or more operations 202 may be representative of the service 106*a* being configured to share one or more local CETs 226*a* and/or one or more local AETs 228*a* to the service 106*b*. The one or more operations 202 may be representative of the service 106*b* being configured to share one or more local CETs 226*b* and/or one or more local AETs 228*b* with the services 106*a*. The one or more operations 204 may be representative of the service 106*b* being configured to share one or more local CETs 226*b* and/or one or more local AETs 228*b* to the service 106*c*. The one or more operations 204 may be representative of the service 106*c* being configured to share one or more local CETs 226*c*and/or one or more local AETs 228*c* with the services 106*b*. The one or more operations 206 may be representative of the service 106*c* being configured to share one or more local CETs 226*c* and/or one or more local AETs 228*c* to the service 106*d*. The one or more operations 206 may be representative of the service 106*d* being configured to share one or more local CETs 226*d* and/or one or more local AETs 228*d* with the services 106*c*. The one or more operations 208 may be representative of the service 106*d* being configured to share one or more local CETs 226*d* and/or one or more local AETs 228*d* to the service 106*g*. The one or more operations 208 may be representative of the service 106*g* being configured to share one or more local CETs 226*g* and/or one or more local AETs 228*g* with the services 106*d*.

The one or more operations 209 may be representative of the services 106*a*-106*g* being configured to share one or more respective local CETs 226*a*-226*g* and/or one or more respective local AETs 228*a*-228*g* to one another. The one or more operations 209 may be representative of the services 106*a*-106*g* being configured to transition one or more data exchange operations 104.

In one or more embodiments, the server 102 may be configured to receive information associated with one or more of the data exchange operations 104 and evaluate the information by executing the one or more ML algorithms 170 to determine whether to apply one or more token comparison and/or reconciliation operations to prevent, inhibit, and/or eliminate loss of data and/or data transition discrepancies and/or errors at one or more of the data exchange operations 104.

At operations 210, the service 106*a* may be configured to provide one or more of the local ID tokens 222*a*, one or more of the local access tokens 224*a*, at least one local CET 226*a*, and/or at least one local AET 228*a* to a token issuer and analyzer 230 in the server 102. At operations 212, the service 106*b* may be configured to provide one or more of the local ID tokens 222*b*, one or more of the local access tokens 224*b*, at least one local CET 226*b*, and/or at least one local AET 228*b* to a token issuer and analyzer 230 in the server 102. At operations 214, the service 106*c* may be configured to provide one or more of the local ID tokens 222*c*, one or more of the local access tokens 224*c*, at least one local CET 226*c*, and/or at least one local AET 228*c* to a token issuer and analyzer 230 in the server 102. At operations 216, the service 106*d* may be configured to provide one or more of the local ID tokens 222*d*, one or more of the local access tokens 224*d*, at least one local CET 226*d*, and/or at least one local AET 228*d* to a token issuer and analyzer 230 in the server 102. At operations 218, the service 106*g* may be configured to provide one or more of the local ID tokens 222*g*, one or more of the local access tokens 224*g*, at least one local CET 226*g*, and/or at least one local AET 228*g* to a token issuer and analyzer 230 in the server 102.

In one or more embodiments, the server 102 may be configured to execute the ML algorithms 170 to perform one or more communication operations where multiple transition tokens 154 are evaluated and compared against one or more reference tokens 142. The server 102 may be configured to enable access to one or more configuration operations via one or more dashboard interfaces 232.

In one or more embodiments, the server 102 is configured to perform one or more data reconciliation and synchronization operations in real-time among multiple services 106 using multi-level tokens. In an incremental approach, data reconciliation and/or synchronization may occur between specific applications rather than end-to-end or start-to-end. For instance, in a specific use case, reconciliation may be required between service 106*b* and service 106*c*, with service 106*b* as an initiator along a communication path comprising services 106*a*-106*g*, in order. In some embodiments, the service 106*a*, which the data exchange operations 104 may already passed, may also requires real-time reconciliation, which is feasible only after service 106*b*. Herein, the operational flow 200 may allow the service 106*a* to participate in real-time reconciliation.

In one or more embodiments, the service 106*b* may be configured to authenticate and authorize the service 106*c* by validating the ID and Access tokens. The service 106*b* may indicate that communication reconciliation is needed as part of the payload, specifying the involved applications (e.g., the service 106*b* and the service 106*a*) and the communication channels and methods. Upon receiving the payload, the service 106*c* may be configured to check whether one or more data exchange operations 104 comprise a reconciliation request (e.g., in a form of one or more transmission reconciliation 148) and sends an indicator to the token issuer, requesting the local AET 228*b* and the CET 226*b* from the service 106*b* and the CET 226*a* from the service 106*a*. The use of equity tokens 160 ensures that each service comprises a specific role and/or responsibility for data reconciliation and synchronization. After processing the one or more data exchange operations 104, the server 106*c* obtains the local AET 228*b* and the local CET 226*b* for the service 106*b* and the local AET 228*a* and the local CET 226*a* for the service 106*a* from the token issuer in real-time. These tokens may be generated such that only intended services 106 may process and/or evaluate these tokens. At this stage, the service 106*c* may be configured to send service-specific and communication-specific tokens to the service 106*b* and the service 106*a* as indicated in a payload, establishing dynamic connections to an intended service 106. In some embodiments, the service 106*b* and the service 106*a* may be configured to share received tokens with the token issuer and analyzer 230 to perform real-time reconciliation. One or more of the operations performed by the token issuer and analyzer 230 may be performed by the server processor 126. The one or more dashboard interfaces 232 may be one or more of the server peripherals 124.

As an example, the service 106*a* may be configured to transition one or more data exchange operations 104 to the service 106*b* along with one or more transition tokens 154 (e.g., a transition ID token 156*a* and/or a transition access token 158*a*) as part of a payload. The transition ID token 156*a* may be used for authentication and the transition access token 158*a* may be used for authorization. In some embodiments, based on details in the payload, the service 106*b* may be configured to determine that the service 106*a* needs reconciliation on as part of the data exchange operations 104 (e.g., the data exchange operations 104 may comprise operations that contain multiple headers, line items with each of header and line item may carry multiple data elements 141*a*). A level of reconciliation may be at an operation-level and/or data elements-level. In this example, the service 106*b* may be configured to perform one or more data exchange operations 104 and create one or more equity tokens 160 (e.g., one or more AETs 162 and/or one or more CETs 166) specifically referencing whether starting data from the service 106*a* is modified by the service 106*b*. The service 106*a* and the service 106*b* may be configured to share corresponding equity tokens 160 with the server 102. Herein, the server 102 may be configured to determine whether the corresponding equity tokens 160 show whether data elements 141 and/or data records 151 changed as part of the data exchange operations performed by the service 106*b*.

Example Process to Reconciliate and Synchronize Multi-level Data Tokens

FIG. 3 illustrates an example flowchart of a process 300 configured to reconciliate and synchronize multi-level data tokens, in accordance with one or more embodiments. Modifications, additions, or omissions may be made to the process 300. The process 300 may comprise more, fewer, or other operations than those shown in FIG. 3. For example, operations may be performed in parallel or in any suitable order. While at times discussed as the server 102, the network devices 108, or components of any of thereof performing operations described in operations 302-352 in the process 300, any suitable system or components of the system 100 may perform one or more operations of the process 300. For example, one or more operations of the process 300 may be implemented, at least in part, in the form of instructions 132 of FIG. 1, stored on non-transitory, tangible, machine-readable media (e.g., a non-transitory computer-readable medium such as memory 130 of FIG. 1) that when run by one or more processors (e.g., the server processor 126 of FIG. 1) may cause the one or more processors to perform operations described in operations 302-352.

The process 300 starts at operation 302, where the server 102 is configured to receive an authentication request 140 from a service 106*a* to authorize a transition of multiple data exchange operations 104 from the service 106*a* to a service 106*b*. The authentication request 140 may comprise an ID token configured to reference that the service 106*a* is entitled to transition the data exchange operations to the service 106*b* and an access token configured to reference whether the service 106*a* is eligible to transition the plurality of data exchange operations 104 to the service 106*b*. At operation 306, the server 102 is configured to determine whether the authentication request 140 is acceptable. At operation 308, the server 102 is configured to determine whether the transition ID token 156*a* matches the reference ID token 144*a* of the one or more tokens. At operation 308, the server 102 is configured to determine whether the transition access token 158*a* matches the reference access token 146*a* of the one or more tokens. In response to determining that the ID token (e.g., a transition ID token 156*a*) matches a reference ID token 144*a* and a transition access token 158*a* matches a reference access token 146*a*, the server 102 may be configured to determine that the first authentication request 140 is acceptable.

At operation 320, the server 102 is configured to determine whether the authentication request 140 is acceptable. If the server 102 determines that the authentication request 140 is acceptable (e.g., NO), the process 300 proceeds to operation 321. If the server 102 determine that the authentication request 140 is acceptable (e.g., YES), the process 300 proceeds to operation 352. At operation 321, the server 102 may be configured to transition the one or more data exchange operations 104 from the first service 106*a* to the second service 106*b*. in response to determining that the authentication request 140 is acceptable. At operation 322, the server 102 is configured to determine whether the data exchange operations 104 comprise a transmission reconciliation 148 to specify that the data exchange operations 104 were communicated to the service 106*a* prior to receiving the authentication request 140. In some embodiments, the server 102 is configured to determine whether the data exchange operations 104 comprise the transmission reconciliation 148 to specify that the data exchange operations 104 were communicated to the service 106*a* as part of receiving the authentication request 140. At operation 324, the server 102 is configured to accept an equity token 160*a* from the service 106*a* in response to determining that the data exchange operations 104 comprise the transmission reconciliation 148. The equity token 160*a* may comprise multiple details for the data exchange operations 104. Further, the server 102 may be configured to accept an equity token 160*b* from the service 106*b*. The equity token 160*b* may comprise multiple details for the data exchange operations 104. At operation 326, the server 102 is configured to determine whether first details in the equity token 160*a* at least partially match second details in the equity token 160*b*.

At operation 340, the server 102 is configured to determine whether the equity token 160*a* at least partially matches the equity token 160*b*. If the server 102 determine that the equity token 160*a* does not at least partially match the equity token 160*b* (e.g., NO), the process 300 proceeds to operation 342. If the server 102 determine that the equity token 160*a* at least partially matches the equity token 160*b* (e.g., YES), the process 300 proceeds may end.

The process 300 may end at operation 342 and operation 344, where the server 102 may be configured to determine that the service 106*b* modified one or more data elements 141 and/or one or more data records 151 as part of one or more data exchange operations 104 performed by the service 106*b*. Herein, the server 102 may be configured to reconcile and/or synchronize the second details of the equity token 160*b* with the first details of the equity token 160*a*. At operation 342, the server 102 is configured to perform real-time reconciliation by acknowledging changes from the first details in the first equity token 160*a* into the second details from the second equity token 160*b*. At operation 344, the server 102 is configured to share the first equity token 160*a* and the second equity token 160*b* with a dashboard application (e.g., the one or more dashboard interfaces 232) as part of real-time monitoring operations. Herein, the server 102 may be configured to generate a reconciliation report (e.g., one of the reports 152) referencing that the first details in the first equity token 160*a* changed into the second details in the second equity token 160*b*. Further, the server 102 is configured to transmit the reconciliation report to the first service 106*a*.

The process 300 may conclude at operation 352, where the server 102 is configured to generate a report 152 referencing that data exchange operations 104 cannot be transitioned. Herein, in response to determining that the authentication request 140 is not acceptable, the server may be configured to broadcast to the service 106*a*, the service 106*b*, and/or any additional network devices 108 and/or services 106 a restarting request 140 to restart the data exchange operations 104.

In one or more embodiments, the server 102 may be configured to reconcile and synchronize equity tokens 160 for several services 106 at a same time. In some embodiments, the equity token 160*a* and the equity tokens 160*b* may be AETs 162. Further, the equity token 160*a* and the equity tokens 160*b* may be CETs 166. The AETs 162 and/or the CETs 166 may comprise one or more record-level details 164 and/or one or more data element-level details 168.

In one or more embodiments, as described above, the one or more record-level details 164 and/or one or more data element-level details 168 may comprise one or more transition identifiers referencing that the exchange operations 104 are transitioned from a first specific service 106 to a second specific service 106. The one or more record-level details 164 and/or one or more data element-level details 168 may comprise one or more record identifiers referencing multiple results associated with a portion of the data exchange operations 104. The portion of the data exchange operations 104 may be specific operations of the data exchange operations 104. The one or more record-level details 164 and/or one or more data element-level details 168 may comprise one or more processing identifiers referencing one or more data elements 141 and/or data records 151 to be modified as part of one or more of the data exchange operations 104 at one or more of the services 106. The one or more record-level details 164 and/or one or more data element-level details 168 may comprise one or more transformation commands referencing one or more transformations for the one or more data elements 141 and/or the one or more data records 151.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:

a memory operable to store:

one or more tokens comprising information representative of one or more data exchange operations associated with one or more services; and at least one processor communicatively coupled to the memory and configured to:

receive a first authentication request from a first service to authorize a first transition of a plurality of data exchange operations from the first service to a second service, the first authentication request comprising:

a first identification (ID) token configured to reference that the first service is entitled to transition the plurality of data exchange operations to the second service; and a first access token configured to reference whether the first service is eligible to transition the plurality of data exchange operations to the second service;

determine whether the first ID token matches a first reference ID token of the one or more tokens;

determine whether the first access token matches a first reference access token of the one or more tokens;

in response to determining that the first ID token matches the first reference access token and the first access token matches the first reference access token, determine that the first authentication request is acceptable;

in response to determining that the first authentication request is acceptable, transition the plurality of data exchange operations from the first service to the second service;

determine whether the plurality of data exchange operations comprise a transmission reconciliation to specify that the plurality of data exchange operations was communicated to the first service prior to receiving the first authentication request;

in response to determining that the plurality of data exchange operations comprise the transmission reconciliation, accept a first equity token from the first service, the first equity token comprising a first plurality of details for the plurality of data exchange operations;

accept a second equity token from the second service, the second equity token comprising a second plurality of details for the plurality of data exchange operations;

determine whether the first plurality of details in the first equity token matches the second plurality of details in the second equity token;

in response to determining that the first plurality of details in the first equity token does not match the second plurality of details in the second equity token, determine that the first plurality of details in the first equity token changed into the second plurality of details in the second equity token;

generate a reconciliation report referencing that the first plurality of details in the first equity token changed into the second plurality of details in the second equity token; and transmit the reconciliation report to the first service.

2. The apparatus of claim 1, wherein the at least one processor is further configured to:

receive a second authentication request from the second service to authorize a second transition of the plurality of data exchange operations from the second service to a third service, the second authentication request comprising a second ID token configured to reference that the second service is entitled to transition the plurality of data exchange operations to the third service and a second access token configured to reference whether the second service is eligible to transition the plurality of data exchange operations to the third service;

determine whether the second ID token matches a second reference ID token out of the one or more tokens;

determine whether the second access token matches a second reference access token out of the one or more tokens;

in response to determining that the second ID token does not match the second reference access token or the second access token does not match the second reference access token, determine that the second authentication request is not acceptable; and in response to determining that the second authentication request is not acceptable, broadcast to the first service, the second service, and the third service a restarting request to restart the plurality of data exchange operations.

3. The apparatus of claim 1, wherein the at least one processor is further configured to:

receive a second authentication request from a first service to authorize a second transition of the plurality of data exchange operations from the second service to a third service, the second authentication request comprising a second ID token configured to reference that the second service is entitled to transition the plurality of data exchange operations to the third service and a second access token configured to reference whether the second service is eligible to transition the plurality of data exchange operations to the third service;

determine whether the second ID token matches a second reference ID token out of the one or more tokens;

determine whether the second access token matches a second reference access token out of the one or more tokens;

in response to determining that the second ID token matches the second reference access token and the second access token matches the second reference access token, determine that the second authentication request is acceptable;

in response to determining that the second authentication request is acceptable, transition the plurality of data exchange operations from the second service to the third service;

determine whether the plurality of data exchange operations comprise an additional transmission reconciliation to specify that the plurality of data exchange operations was communicated to the first service prior to receiving the first authentication request;

in response to determining that the plurality of data exchange operations comprise the additional transmission reconciliation, accept a third equity token from the first service, the third equity token comprising a third plurality of details for the plurality of data exchange operations;

accept a fourth equity token from the second service, the fourth equity token comprising a fourth plurality of details for the plurality of data exchange operations;

accept a fifth equity token from the second service, the fifth equity token comprising a fifth plurality of details for the plurality of data exchange operations;

determine whether the third plurality of details in the third equity token and the fourth plurality of details in the fourth equity token match the fifth plurality of details in the fifth equity token;

in response to determining that the third plurality of details in the third equity token and the fourth plurality of details in the fourth equity token do not match the fifth plurality of details in the fifth equity token, determine that the third plurality of details in the third equity token and the fourth plurality of details in the fourth equity token changed into the fifth plurality of details in the fifth equity token;

generate an additional reconciliation report referencing that the first plurality of details in the third plurality of details in the third equity token and the fourth plurality of details in the fourth equity token changed into the fifth plurality of details in the fifth equity token; and transmit the additional reconciliation report to the first service and the second service.

4. The apparatus of claim 1, wherein the first equity token is an application-specific equity token (AET) comprising:

record-level details for the plurality of data exchange operations.

5. The apparatus of claim 4, wherein the record-level details comprise:

one or more transition identifiers referencing that the plurality of data exchange operations is transitioned from the first service to the second service; and one or more record identifiers referencing a plurality of results associated with a portion of the plurality of data exchange operations, the portion of the plurality of data exchange operations being specific operations of the plurality of data exchange operations performed by the first service.

6. The apparatus of claim 1, wherein the first equity token is a communication equity token (CET) comprising:

data element-level details for the plurality of data exchange operations.

7. The apparatus of claim 6, wherein the data element-level details comprise:

one or more processing identifiers referencing one or more data elements to be modified as part of the plurality of data exchange operations at the second service; and one or more transformation commands referencing a plurality of transformations for the one or more data elements.

8. A method, comprising:

receiving a first authentication request from a first service to authorize a first transition of a plurality of data exchange operations from the first service to a second service, the first authentication request comprising:

a first identification (ID) token configured to reference that the first service is entitled to transition the plurality of data exchange operations to the second service; and a first access token configured to reference whether the first service is eligible to transition the plurality of data exchange operations to the second service;

determining whether the first ID token matches a first reference ID token of one or more tokens;

determining whether the first access token matches a first reference access token of one or more tokens;

in response to determining that the first ID token matches the first reference access token and the first access token matches the first reference access token, determining that the first authentication request is acceptable;

in response to determining that the first authentication request is acceptable, transitioning the plurality of data exchange operations from the first service to the second service;

determining whether the plurality of data exchange operations comprise a transmission reconciliation to specify that the plurality of data exchange operations was communicated to the first service prior to receiving the first authentication request;

in response to determining that the plurality of data exchange operations comprise the transmission reconciliation, accepting a first equity token from the first service, the first equity token comprising a first plurality of details for the plurality of data exchange operations;

accepting a second equity token from the second service, the second equity token comprising a second plurality of details for the plurality of data exchange operations;

determining whether the first plurality of details in the first equity token matches the second plurality of details in the second equity token;

in response to determining that the first plurality of details in the first equity token does not match the second plurality of details in the second equity token, determining that the first plurality of details in the first equity token changed into the second plurality of details in the second equity token;

generating a reconciliation report referencing that the first plurality of details in the first equity token changed into the second plurality of details in the second equity token; and transmitting the reconciliation report to the first service.

9. The method of claim 8, further comprising:

receiving a second authentication request from the second service to authorize a second transition of the plurality of data exchange operations from the second service to a third service, the second authentication request comprising a second ID token configured to reference that the second service is entitled to transition the plurality of data exchange operations to the third service and a second access token configured to reference whether the second service is eligible to transition the plurality of data exchange operations to the third service;

determining whether the second ID token matches a second reference ID token out of the one or more tokens;

determining whether the second access token matches a second reference access token out of the one or more tokens;

in response to determining that the second ID token does not match the second reference access token or the second access token does not match the second reference access token, determining that the second authentication request is not acceptable; and in response to determining that the second authentication request is not acceptable, broadcasting to the first service, the second service, and the third service a restarting request to restart the plurality of data exchange operations.

10. The method of claim 8, further comprising:

receiving a second authentication request from a first service to authorize a second transition of the plurality of data exchange operations from the second service to a third service, the second authentication request comprising a second ID token configured to reference that the second service is entitled to transition the plurality of data exchange operations to the third service and a second access token configured to reference whether the second service is eligible to transition the plurality of data exchange operations to the third service;

determining whether the second ID token matches a second reference ID token out of the one or more tokens;

determining whether the second access token matches a second reference access token out of the one or more tokens;

in response to determining that the second ID token matches the second reference access token and the second access token matches the second reference access token, determining that the second authentication request is acceptable;

in response to determining that the second authentication request is acceptable, transitioning the plurality of data exchange operations from the second service to the third service;

determining whether the plurality of data exchange operations comprise an additional transmission reconciliation to specify that the plurality of data exchange operations was communicated to the first service prior to receiving the first authentication request;

in response to determining that the plurality of data exchange operations comprise the additional transmission reconciliation, accepting a third equity token from the first service, the third equity token comprising a third plurality of details for the plurality of data exchange operations;

accepting a fourth equity token from the second service, the fourth equity token comprising a fourth plurality of details for the plurality of data exchange operations;

accepting a fifth equity token from the second service, the fifth equity token comprising a fifth plurality of details for the plurality of data exchange operations;

determining whether the third plurality of details in the third equity token and the fourth plurality of details in the fourth equity token match the fifth plurality of details in the fifth equity token;

in response to determining that the third plurality of details in the third equity token and the fourth plurality of details in the fourth equity token do not match the fifth plurality of details in the fifth equity token, determining that the third plurality of details in the third equity token and the fourth plurality of details in the fourth equity token changed into the fifth plurality of details in the fifth equity token;

generating an additional reconciliation report referencing that the first plurality of details in the third plurality of details in the third equity token and the fourth plurality of details in the fourth equity token changed into the fifth plurality of details in the fifth equity token; and transmitting the additional reconciliation report to the first service and the second service.

11. The method of claim 8, wherein the first equity token is an application-specific equity token (AET) comprising:

record-level details for the plurality of data exchange operations.

12. The method of claim 11, wherein the record-level details comprise:

one or more transition identifiers referencing that the plurality of data exchange operations is transitioned from the first service to the second service; and one or more record identifiers referencing a plurality of results associated with a portion of the plurality of data exchange operations, the portion of the plurality of data exchange operations being specific operations of the plurality of data exchange operations performed by the first service.

13. The method of claim 8, wherein the first equity token is a communication equity token (CET) comprising:

data element-level details for the plurality of data exchange operations.

14. The method of claim 13, wherein the data element-level details comprise:

one or more processing identifiers referencing one or more data elements to be modified as part of the plurality of data exchange operations at the second service; and one or more transformation commands referencing a plurality of transformations for the one or more data elements.

15. A non-transitory computer-readable medium storing instructions that when executed by a processor cause the processor to:

receive a first authentication request from a first service to authorize a first transition of a plurality of data exchange operations from the first service to a second service, the first authentication request comprising:

a first identification (ID) token configured to reference that the first service is entitled to transition the plurality of data exchange operations to the second service; and a first access token configured to reference whether the first service is eligible to transition the plurality of data exchange operations to the second service;

determine whether the first ID token matches a first reference ID token of one or more tokens;

determine whether the first access token matches a first reference access token of the one or more tokens;

in response to determining that the first ID token matches the first reference access token and the first access token matches the first reference access token, determine that the first authentication request is acceptable;

in response to determining that the first authentication request is acceptable, transition the plurality of data exchange operations from the first service to the second service;

determine whether the plurality of data exchange operations comprise a transmission reconciliation to specify that the plurality of data exchange operations was communicated to the first service prior to receiving the first authentication request;

in response to determining that the plurality of data exchange operations comprise the transmission reconciliation, accept a first equity token from the first service, the first equity token comprising a first plurality of details for the plurality of data exchange operations;

accept a second equity token from the second service, the second equity token comprising a second plurality of details for the plurality of data exchange operations;

determine whether the first plurality of details in the first equity token matches the second plurality of details in the second equity token;

in response to determining that the first plurality of details in the first equity token does not match the second plurality of details in the second equity token, determine that the first plurality of details in the first equity token changed into the second plurality of details in the second equity token;

generating a reconciliation report referencing that the first plurality of details in the first equity token changed into the second plurality of details in the second equity token; and transmitting the reconciliation report to the first service.

16. The non-transitory computer-readable medium of claim 15, wherein, when executed by the processor, the instructions further cause the processor to:

receive a second authentication request from the second service to authorize a second transition of the plurality of data exchange operations from the second service to a third service, the second authentication request comprising a second ID token configured to reference that the second service is entitled to transition the plurality of data exchange operations to the third service and a second access token configured to reference whether the second service is eligible to transition the plurality of data exchange operations to the third service;

determine whether the second ID token matches a second reference ID token out of the one or more tokens;

determine whether the second access token matches a second reference access token out of the one or more tokens;

in response to determining that the second ID token does not match the second reference access token or the second access token does not match the second reference access token, determine that the second authentication request is not acceptable; and in response to determining that the second authentication request is not acceptable, broadcast to the first service, the second service, and the third service a restarting request to restart the plurality of data exchange operations.

17. The non-transitory computer-readable medium of claim 15, wherein the first equity token is an application-specific equity token (AET) comprising:

record-level details for the plurality of data exchange operations.

18. The non-transitory computer-readable medium of claim 17, wherein the record-level details comprise:

one or more transition identifiers referencing that the plurality of data exchange operations is transitioned from the first service to the second service; and one or more record identifiers referencing a plurality of results associated with a portion of the plurality of data exchange operations, the portion of the plurality of data exchange operations being specific operations of the plurality of data exchange operations performed by the first service.

19. The non-transitory computer-readable medium of claim 15, wherein the first equity token is a communication equity token (CET) comprising:

data element-level details for the plurality of data exchange operations.

20. The non-transitory computer-readable medium of claim 19, wherein the data element-level details comprise:

one or more processing identifiers referencing one or more data elements to be modified as part of the plurality of data exchange operations at the second service; and one or more transformation commands referencing a plurality of transformations for the one or more data elements.

* * * * *